(12) United States Patent
Liu

(10) Patent No.: US 7,362,780 B2
(45) Date of Patent: Apr. 22, 2008

(54) AVOIDING COMPRESSION OF ENCRYPTED PAYLOAD

(75) Inventor: Zhigang Liu, Irving, TX (US)

(73) Assignee: Nokia Corporation, Espoo (FI)

( * ) Notice: Subject to any disclaimer, the term of this patent is extended or adjusted under 35 U.S.C. 154(b) by 1023 days.

(21) Appl. No.: 10/316,058

(22) Filed: Dec. 11, 2002

(65) Prior Publication Data
US 2004/0114634 A1 Jun. 17, 2004

(51) Int. Cl.
*H04J 3/00* (2006.01)
(52) U.S. Cl. ................ 370/521; 713/190
(58) Field of Classification Search ........... 709/247, 709/237; 370/474, 521; 345/422, 555; 713/190, 713/191; 380/269
See application file for complete search history.

(56) References Cited

U.S. PATENT DOCUMENTS

| | | | |
|---|---|---|---|
| 5,850,526 A * | 12/1998 | Chou ................. | 709/247 |
| 6,452,602 B1 * | 9/2002 | Morein ............... | 345/555 |
| 6,618,397 B1 * | 9/2003 | Huang ................ | 370/474 |
| 6,630,933 B1 * | 10/2003 | Van Hook ........... | 345/422 |
| 2002/0002636 A1 | 1/2002 | Vange et al. | |
| 2002/0015422 A1 * | 2/2002 | Inada et al. ........ | 370/474 |
| 2002/0078242 A1 * | 6/2002 | Viswanath .......... | 709/247 |
| 2002/0112152 A1 * | 8/2002 | VanHeyningen et al. ... | 713/151 |
| 2002/0138551 A1 * | 9/2002 | Erickson ............ | 709/203 |
| 2004/0005057 A1 * | 1/2004 | Jang et al. .......... | 380/270 |
| 2004/0083360 A1 * | 4/2004 | Walsh et al. ....... | 713/160 |

OTHER PUBLICATIONS

Dierks, T. and C. Allen, "The TLS Protocol", IETF RFC 2246, Jan. 1999, pp. 1-75.
Kent, S., and R. Atkinson, "IP Encapsulating Security Payload", RFC 2406, Nov. 1998, pp. 1-21.
Glenn, R., and S. Kent, "The NULL Encryption Algorithm and Its Use with IPsec", RFC 2410, Nov. 1998, pp. 1-6.
Kent, S., and R. Atkinson, "Security Architecture for the Internet Protocol", RFC 2401, Nov. 1998, pp. 1-62.
Shannon, C, Moore, D. and K. Claffy, "Characteristics of Fragmented IP Traffic on Internet Links", Proceedings of the First ACM SIGCOMM Workshop on Internet Measurement Worskshop, Nov. 2001, 15 pgs.
Fielding, R., et al, "Hypertext Transfer Protocol 1.1—HTTP/1.1", IETF RFC 2616, Jun. 1999, pp. 1-165.
Rescorla, E., "HTTP Over TLS", IETF RFC 2818, May 2000, pp. 1-7.
Khare, R. and S. Lawrence, "Upgrading to TLS Within HTTP/1.1", IETF RFC 2817, May 2000, 13 pgs.
Port Numbers (168 Pgs.).
Port Numbers (168 Pgs.), 2002.

* cited by examiner

*Primary Examiner*—Edan Orgad
*Assistant Examiner*—Chuong Ho
(74) *Attorney, Agent, or Firm*—Squire, Sanders & Dempsey, L.L.P.

(57) ABSTRACT

The invention proposes a method for conveying data packets in a network, comprising the steps of examining (S1, S2) whether a received data packet is encrypted, compressing (S3) the data packet in case it is examined that the data packet is not encrypted, and refraining form compressing (S4) in case it is examined that the data packet is encrypted. The invention also proposes a corresponding network element.

30 Claims, 6 Drawing Sheets

AVOIDING COMPRESSION OF ENCRYPTED PAYLOAD

FIELD OF THE INVENTION

The present invention relates to a method and a network element for conveying data packets in a network.

BACKGROUND OF THE INVENTION

The present invention relates to compression of payload carried in data packets, e.g., IP (Internet Protocol) packets and/or UDP and TCP packets. The purpose of such compression is to reduce IP traffic throughput, especially over bandwidth limited links (e.g. air interface, radio links).

The compression/decompression can be performed either a) end-to-end, or b) only on a segment of the packet traversal path that has limited bandwidth. For example, the compression can be performed in a router and/or central network elements like GGSN (Gateway GPRS Supporting Node, GPRS=General Packet Radio Service) or SGSN (Serving GPRS Supporting Node), for example.

In certain architectures, the compression is not performed end-to-end. Instead, it is applied in an intermediate node on the traversal path of IP packets. If the source or another node before the compressor already applied encryption, compression will not reduce the packet size due to the nature of encryption. Therefore, the Central Processing Unit CPU resource is simply wasted.

This may occur, for example, in the above-described architecture b) when UDP/TCP packets carry data encrypted by TLS/SSL, as described in Dierks, T. and C. Allen, "The TLS Protocol", IETF RFC 2246, January 1999. Namely, in architecture b), a compressor may not be located at the packet source. Therefore, the compressor may receive UDP/TCP packets carrying data that has been encrypted by TLS/SSL. If it blindly compresses those packets, it will not reduce packet size and thus the CPU resource and memory resource are simply wasted.

Another example for the applied encryption is ESP (Encapsulating Security Payload) which is described in Kent, S., and R. Atkinson, "IP Encapsulating Security Payload", RFC 2406, November 1998.

Thus, there is a problem in the prior art that compression of data packets is performed although it would not be necessary.

SUMMARY OF THE INVENTION

Thus, the object underlying the present invention resides in improving the performance of the compression function when handling data packets that have already been encrypted before the compressor.

This object is solved by a method for conveying data packets in a network, comprising the steps of
examining whether a received data packet is encrypted,
compressing the data packet in case it is examined that the data packet is not encrypted, and
refraining form compressing in case it is examined that the data packet is encrypted.

Alternatively, the above object is solved by a network element adapted to convey data packets in a network, wherein the network element is adapted to examine whether a received data packet is encrypted,
compress the data packet in case it is examined that the data packet is not encrypted, and
refrain form compressing in case it is examined that the data packet is encrypted.

Thus, according to the invention, compression of payload of a data packet that has already been encrypted is avoided. Namely, a good encryption algorithm tends to remove pattern (i.e. redundancy) from the original data. Thus, a compression of encrypted data will not reduce the data size and, thus, would be a waste of CPU resource.

This is in particular important for a compressor located in a router that needs to process large amounts of IP packets at very high speed.

Hence, the performance of the compression function is improved.

The examining step may be performed by detecting whether the use of a particular encryption algorithm is indicated in the header of the data packet. Thus, a decision whether a data packet is encrypted can simply be performed by checking the header of the data packet, which needs to be read anyway by, for example, a router which forwards the data packet.

The particular encryption algorithm may be Encapsulating Security Payload (ESP).

In case it is decided that the data packet is encrypted, before the compression step, the following steps may be carried out:
examining whether the data packet belongs to a group of data packets which are encrypted with a NULL algorithm,
in case the data packet belongs to the group, compressing the packet according to a compression indication associated to the group.

In this way, a problem which occurs on using a so-called NULL encryption algorithm can be handled. Namely, the encryption can be indicated in the header of the data packet, for example, such that this would lead to the impression that the data packet is encrypted, even if the encryption algorithm used is the NULL algorithm. However, the NULL encryption does nothing with the data packet, so that a compression thereof would be effective. Hence, according to this aspect of the invention, the data packet encrypted with the NULL encryption algorithm is compressed although it is encrypted.

Information regarding the group of data packets may be listed in a lookup table, wherein the information may comprise at least a destination address of the data packet and the compression indication. Thus, the corresponding data packets encrypted with the NULL algorithm can easily be identified by the destination address, and from the compression indication it can easily be derived whether the particular data packet is to be compressed or not. The compression indication may be a flag.

Furthermore, the data packets may be identified by the above destination address and a Security Parameters Index (SPI) which is also to be stored in the lookup table. That is, the group of data packets may be identified by using the concept of Security Association (SA).

In case the data packet does not belong to a group of data packets encrypted with the NULL encryption algorithm, a new entry in the lookup table may be created, wherein the group of data packets may be identified by a destination address of the packet, and wherein
a compression may be performed, and the result of compression may be evaluated, wherein the compression indication may be set according to the result of the compression.

In this way, the table can reliably be updated.

The result of compression is evaluated by checking a percentage of compression. Namely, a certain threshold X %<100% can be set, and wherein in case the percentage of compression is smaller than X, it can be decided that the compression was successful and that the other data packets belonging to that particular group identified by the destination address should also be compressed.

Moreover, a table for fragmented data packets may be provided, a data packet being identified therein by at least a source address, a destination address and a compression indication indicating whether this data packet should be compressed or not, wherein in the examining step, the following steps may be carried out:
    judging whether the source address and the destination address of the data packet matches with an entry of the table for fragmented data packets, and
    compressing or not compressing the data packet corresponding to the compression indication.

In this way, the problem of fragmented data packets can be handled, the headers of which do not indicate whether they are encrypted or not. By providing the table for fragmented data packets, the fragmented data packets can be identified and it can be decided from the table (i.e., the compression indication, which may be a flag) whether the data packet should be compressed or not.

In case it is examined that the data packet is encrypted, a new entry in the table for fragmented data packets may be created, wherein the compression indication is set depending on whether the encrypted data packet should be compressed or not.

Thus, the table for fragmented data packets can reliably be updated.

Furthermore, in the examining step it may be checked whether the data packet belongs to a group of encrypted data packets, and when the data packet belongs to a group of encrypted data packets, the data packet is not compressed.

Thus, groups of data packets may be formed, for which it is clear that compression is to be performed or not to be performed. Hence, it is not necessary to carry out further examination whether this particular data packet is encrypted or not.

It may be checked whether the data packet belongs to the group of encrypted data packets by checking the source and/or destination connection type of the data packet. That is, the data packet may be identified by the connection type.

Furthermore, a table may provided in which connections in a network using encryption are stored, wherein for each entry a source address, a destination address and a destination connection type indication is stored.

Thus, whole connection types may be identified which convey only encrypted data packet. For example, such a connection may be TLS/SSL (Transport Layer Security/Security Sockets Layer).

In the examining step, the following steps may be carried out:
    deciding whether a data packet is received via a specific source connection type or is to be sent via a specific destination connection type,
    in case the data packet is received via the specific source connection type or to be sent to the specific destination connection type,
        extracting the source address, the destination address and the destination connection type from the data packet, and
        searching for a match with the table,
            wherein in case a match is found, the data packet is not compressed.

In this way, the data packets identified by the source and destination addresses and connection type can be left uncompressed, since it is known from the table that packets of this group are encrypted.

In case the data packet is received via a specific connection type and no match is found, the data packet is searched for an indication of a specific encryption procedure, and in case the indication is found, a new entry is created in the table with the source address, destination address and connection type of the data packet.

The connection type may be defined by a port number. For example, in IP, the "normal" port number for the HTTP (Hypertext Transfer Layer) protocol is 80, whereas HTTP protocol over TLS uses port number 443.

The specific encryption procedure may be a Transport Layer Security (TLS) protocol. In particular, the indication for this may be a specific message included in a data packet, e.g., a so-called 101 response.

DETAILED DESCRIPTION OF PREFERRED EMBODIMENTS

In the following, preferred embodiments are described by referring to the enclosed drawings.

Compression of payload in data packets (e.g., IP packets) is an effective approach to reduce IP traffic throughput, especially over the air interface where bandwidth is limited.

As already described in the foregoing, in certain architectures the compression is not performed end-to-end. Instead, it is applied in an intermediate node on the traversal path of IP packets. An example is shown in FIG. 1, where a compressor is located in a router.

According to the first embodiment, a procedure is employed by which compression of IP packets that have already been compressed is avoided.

In the following, ESP (Encapsulating Security Payload) is used as an example to describe the scheme since it is the current standard in Internet Task Engineering Force (IETF) for encryption at IP layer. However, the embodiment can be applied to IP packets encrypted by any other encryption protocols developed in the future as long as they can be identified by checking IP headers.

Figure 1:
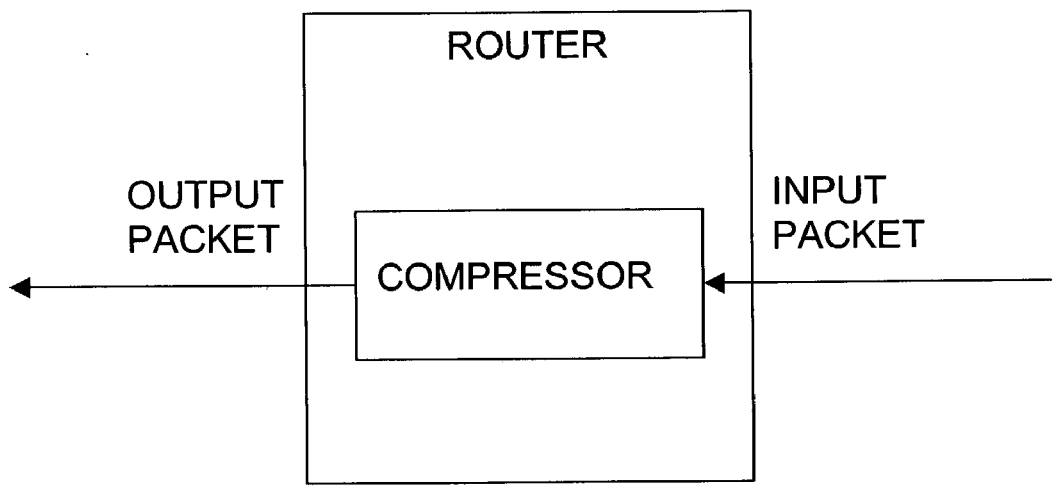
FIG. 1 shows a router to which the method according to the embodiments is applied.

Moreover, as an example the compressor incorporated in the router as shown in FIG. 1 is used. Nevertheless, the compressor can be located in any other network element forwarding data packets.

Figure 2:
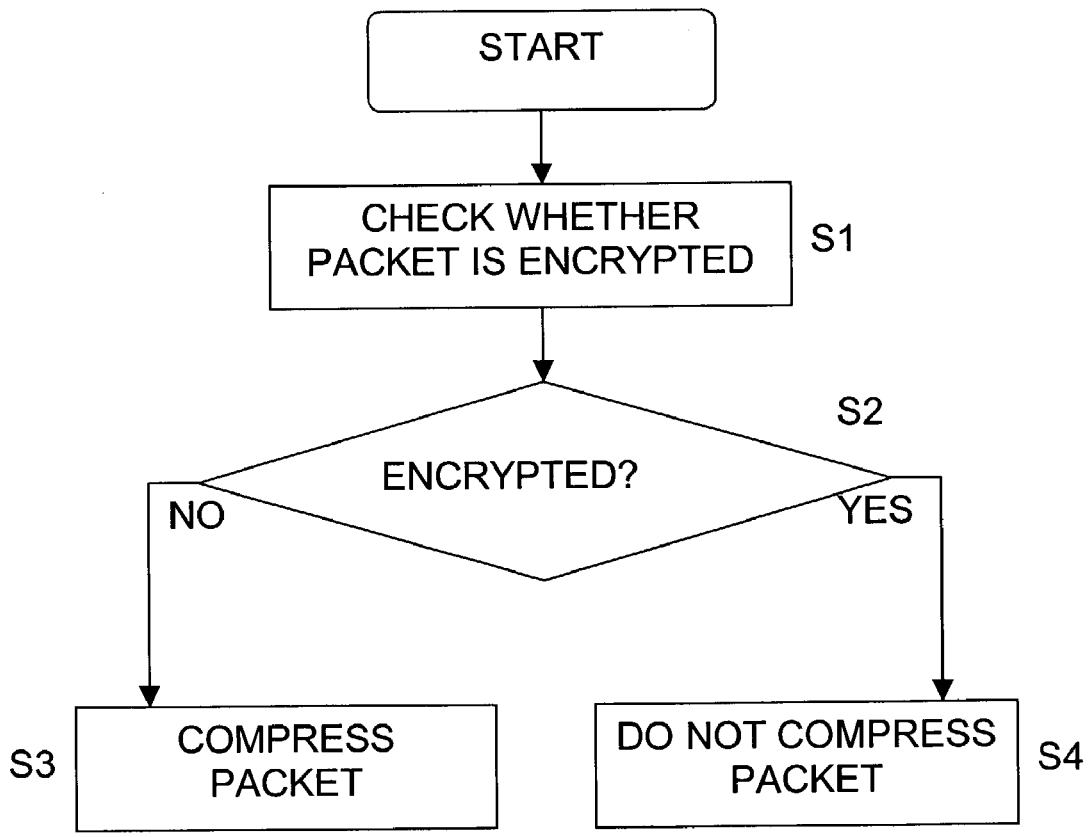
FIG. 2 shows a flow chart illustrating a procedure according to a first embodiment of the invention.
Figure 3:
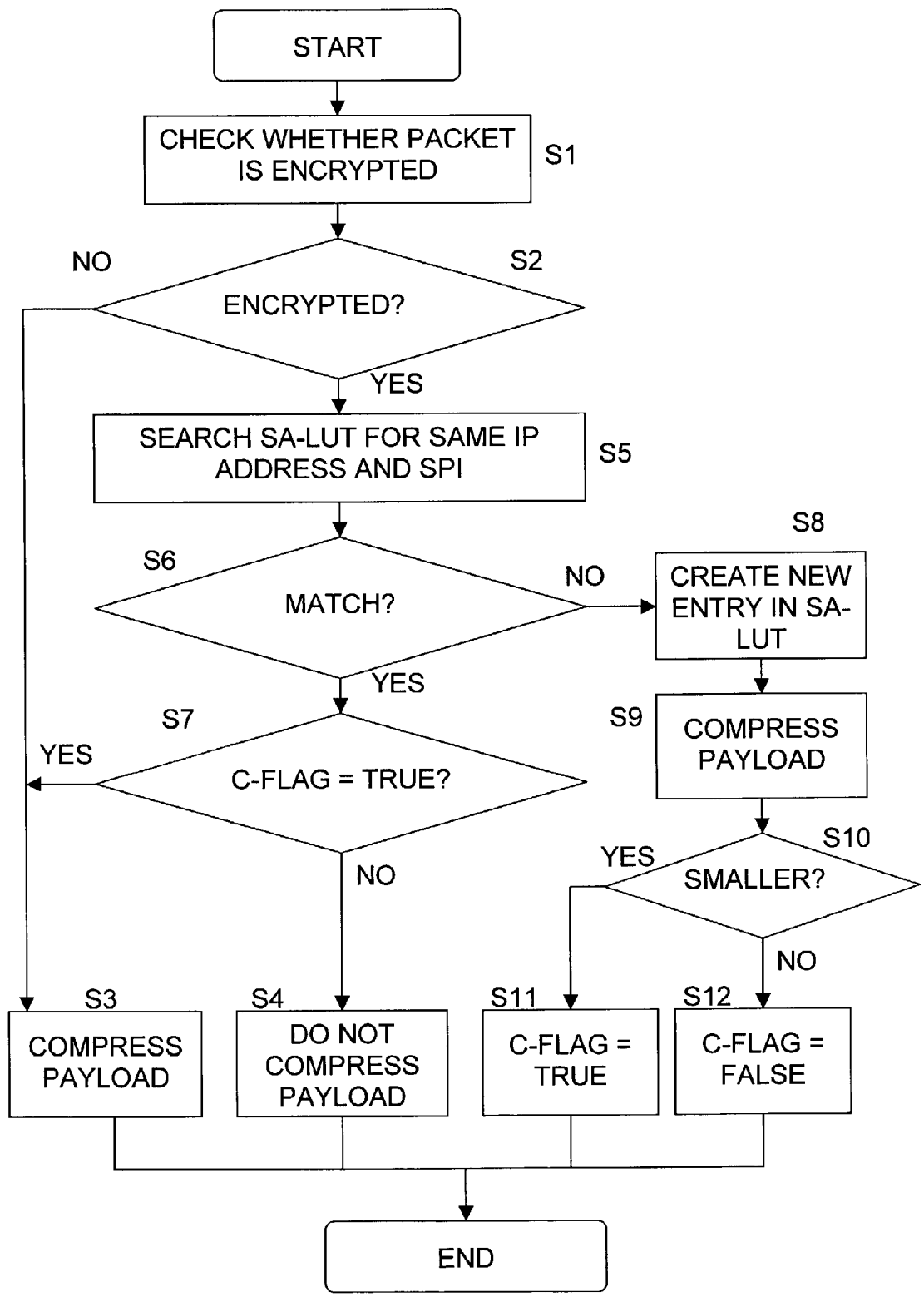
FIG. 3 shows a flow chart illustrating a procedure according to a second embodiment of the invention, the procedure being directed to handle data packets encrypted by a NULL encryption algorithm.

In the following, the procedure according to the first embodiment is described by referring to the flow chart shown in FIG. 2. This procedure is referred to as "Scheme A".

1.) When the compressor receives an IP packet, it first checks whether the packet is encrypted in step S1. In detail, the compressor checks if ESP has been applied to this packet. This can be done because the protocol header (Ipv4, Ipv6, or Extension) immediately preceding the ESP header will contain the value 50 in its Protocol (Ipv4) or Next Header (Ipv6, Extension) field. This is defined in Kent, S., and R. Atkinson, "IP Encapsulating Security Payload", RFC 2406, November 1998. So, the compressor can simply check those header fields to see if its value is 50. The decision is illustrated in step S2.

2.) If the compressor has found that the data packet is encrypted in step S2, i.e., if the ESP header is found, the compressor will not compress these IP packets (i.e., the payload of the packets) as shown in step S4. However, if the packet is not encrypted, i.e., the ESP header is not found, the packet will be compressed, as illustrated in step S3.

The procedure according to the first embodiment works perfectly in case the encryption can be reliably recognized by checking the header. However, there is one minor problem in case the so-called NULL encryption algorithm is used for an ESP packet. The NULL encryption algorithm is described in Glenn, R., and S. Kent, "The NULL Encryption Algorithm and Its Use With Ipsec", RFC 2410, November 1998.

Essentially, NULL encryption algorithm does nothing. That is, the NULL algorithm can be defined mathematically by the use of the Identiy function I applied to a block of data b:

$$NULL(b)=I(b)=b$$

It is a convenient way to represent the option of not applying encryption. Compression should still be applied to payload carried in ESP when NULL encryption is used. Otherwise, some compression efficiency will be lost.

According to the second embodiment, it is described how it can be figured out whether NULL encryption algorithm was used in an ESP packet. Note that there is no self-identifying field in IP and ESP headers to indicate which encryption algorithm is used. That is, it is not possible to identify the kind of encryption algorithm, so that also the NULL algorithm is identified as a normal encryption algorithm although it actually does not encrypt.

One way to tackle the problem is to use the concept of Security Association (SA). The Security Association is described in Kent, S., and R. Atkinson, "Security Architecture for the Internet Protocol", RFC 2401, November 1998.

An SA is uniquely identified by a triple <Security Parameters Index (SPI), destination IP address, security protocol identifier>. The security protocol may be ESP (Encapsulating Security Payload) as described above, for example. One can derive the SA for any given IP packet since all of the three values are carried in headers (SPI in ESP header and the other two in IP header). In addition, the encryption algorithm (among many other security parameters) does not change for packets that have the same SA. Therefore, if the compressor can detect or guess if NULL encryption is used for the first ESP packet associated with a particular SA, it then knows whether it should compress the subsequent packets for that SA.

The procedure according to the second embodiment which is based on this idea is referred to as Scheme B.

1.) The compressor maintains an SA lookup table that conceptually has three columns: destination IP address, SPI, and a C-flag. C-flag is to indicate whether packets for this SA should be compressed.

(Note: there is no column for security protocol identifier in the table as it assumed in this example that ESP is the encryption protocol. If new encryption protocols are developed in the future in IETF, the compressor can have two options: a) add protocol identifier to the lookup table and use the same table for all encryption protocols; or b) maintain a separate lookup table for each encryption protocol. Option b) is better since in reality, the number of IP encryption protocols should be very small. ESP will be probably the only IP encryption protocol for the foreseeable future.)

2.) Initially, the SA lookup table is empty.

3.) When the compressor receives an IP packet, it first checks if the packet carries ESP following the step 1) in Scheme A according to the first embodiment (i.e., steps S1 and S2 in FIG. 2). If the answer is no, it will compress the packet (as illustrated in step S3) and skip the remaining steps.

4.) If, however, the packet carries ESP (yes in step S2), the compressor will search the SA lookup table for an entry with the same destination IP address and SPI as carried in the packet (step S5).

If a matching entry is found (yes in step S6), the process proceeds to step S7 in which it the value of the C-flag is evaluated. In case the C-flag is set to true, the compressor compresses the packet (step S3). On the other hand, if the C-Flag is not TRUE, i.e., set on FALSE, the compressor will not compress the packet.

5.) If no matching entry is found in Step S6, the compressor will create a new entry in the SA lookup table using the destination IP address and SPI carried in the packet (step S8). Then, it will compress the IP payload (step S9).

Thereafter, the size of the compressed packet is evaluated in step S10. For this, an implementation parameter X may be defined, with X %<100%. If the compression yields a smaller packet whose size is equal to or less than X % of the original one, it will assume NULL encryption algorithm was used for this SA and set the C-flag in the entry to TRUE (S11). Namely, if the packet size is considerably reduced, it can be assumed that no encryption took place. Otherwise, it will set C-flag to FALSE (S12).

6.) The existing entries in the SA lookup table can be deleted. This is an implementation issue. For example, the compressor can choose the timeout approach by deleting an entry that has not been matched after a certain period of time. In addition, if the table size reaches some predefined upper bound, the compressor may need to delete an existing entry to make room for a new one. Different replacement policies can be used here. For example, the compressor may replace the least recently used (LRU) entry in the table.

It is noted that in the scheme B according to the second embodiment, an over-simplified structure of lookup table is used above to illustrate the concept. However, a real implementation should use the standard techniques such hashing and binary search to speed up the SA lookup in Step B4). With those techniques, the CPU cost of the SA lookup should be negligible compared to that of compressing an IP packet. This means that even a small "hit" (i.e. the lookup result is not to compress) rate will lead to a gain in reducing the overall CPU consumption. Note that the worst-case scenario in which all SAs use NULL encryption (i.e. hit rate=0%) is unlikely in practice.

Moreover, it is possible that for an SA using NULL encryption, the first packet coincidentally carries uncompressible data. In that case, Step B5) will lead a compressor to believe incorrectly that the SA uses non-NULL encryption algorithm. The result would be that the compressor does not compress the subsequent packets for that SA although they may be compressible. However, such possibility is too small to have any significant impact over the overall compression ratio.

Furthermore, it is noted that scheme B according to the second embodiment requires additional memory than Scheme A according to the first embodiment, since the SA lookup table has to be stored. However, this is not be a problem for two reasons. First, the lookup table only needs about 9 bytes per entry for IPv4 (Internet Protocol version 4) and 21 bytes for IPv6 (Internet Protocol version 6), for example. Second, for each entry corresponding to an SA that does not use NULL encryption algorithm, the reward is the savings of CPU consumption that would be wasted otherwise to compress all packets belonging to that SA. This benefit outweighs the cost.

In certain cases, it may be desirable to use scheme A according to the first embodiment instead of scheme B according to the second embodiment for its simplicity. The choice depends on the trade-off between memory, CPU and compression ratio (or equivalently the throughput after compression). If a %=percentage of IP packets received by a compressor that are encrypted, and b %=percentage of those encrypted packets that are encrypted using NULL algorithm, the degradation of overall compression ratio is in the order of a %*b % when Scheme A is used. If the degradation is small or tolerable, a system may choose Scheme A to reduce memory and CPU cost.

Note that the cost reduction is due to both the absence of SA lookup table and the fact that a %*b % packets are not compressed.

It is noted that in the third embodiment the Security Association (SA) is only an example for a group of data packets which can be identified by at least the destination address. Other groups are possible, which can reliably be identified.

In addition, it is possible that there are fragmented ESP packets. In particular, it is possible that an IP packet encrypted using ESP may be fragmented before it reaches the compressor. In that case, the ESP header will be carried only in the first fragment and not in the subsequent fragments. Consequently, the compressor cannot identify the subsequent fragments as encrypted and will not avoid compressing them.

However, ESP fragmentation has negligible impact on effectiveness of the invention. It has been measured that only about 5% of ESP packets are fragmented on Internet links. This is described in Shannon, C., Moore, D., and K. Claffy, "Characteristics of Fragmented IP Traffic on Internet Links", Proceedings of the First ACM SIGCOMM Workshop on Internet Measurement Workshop November 2001, for example. Assuming two fragments per original ESP packet (which is also observed as the most typical case in the above-mentioned document), only about 2.5% of all encrypted packets will be not be identified by the invention. It is noted that it is not to be expected that the fragmentation rate will increase in future because IP fragmentation is considered harmful to Internet and is therefore avoided whenever possible.

According to the third embodiment, a procedure is presented to solve the problem regarding the handling of fragmented ESP packets. This solution is presented in the following by referring to a flowchart in FIG. 4.

Namely, the procedure according to the first or the second embodiment can be extended with a fragmentation lookup table (similar to the SA lookup table). Each entry of the table consists of tuple <source IP address, destination IP address, IP Identification, protocol, C-flag> in case of Ipv4, or <source IP address, destination IP address and IP Identification, C-flag> in case of Ipv6. Note that the tuple uniquely identifies all fragments belonging to one original IP packet.

Upon receiving an ESP packet, the compressor creates an entry in the table corresponding to the packet. When receiving a non-ESP packet, the compressor searches the table for a match. If a match is found, that means the received packet is a fragment of an original ESP packet even though itself does not carry an ESP header. Then the compressor can decide whether to compress it according to the C-flag.

Figure 4:
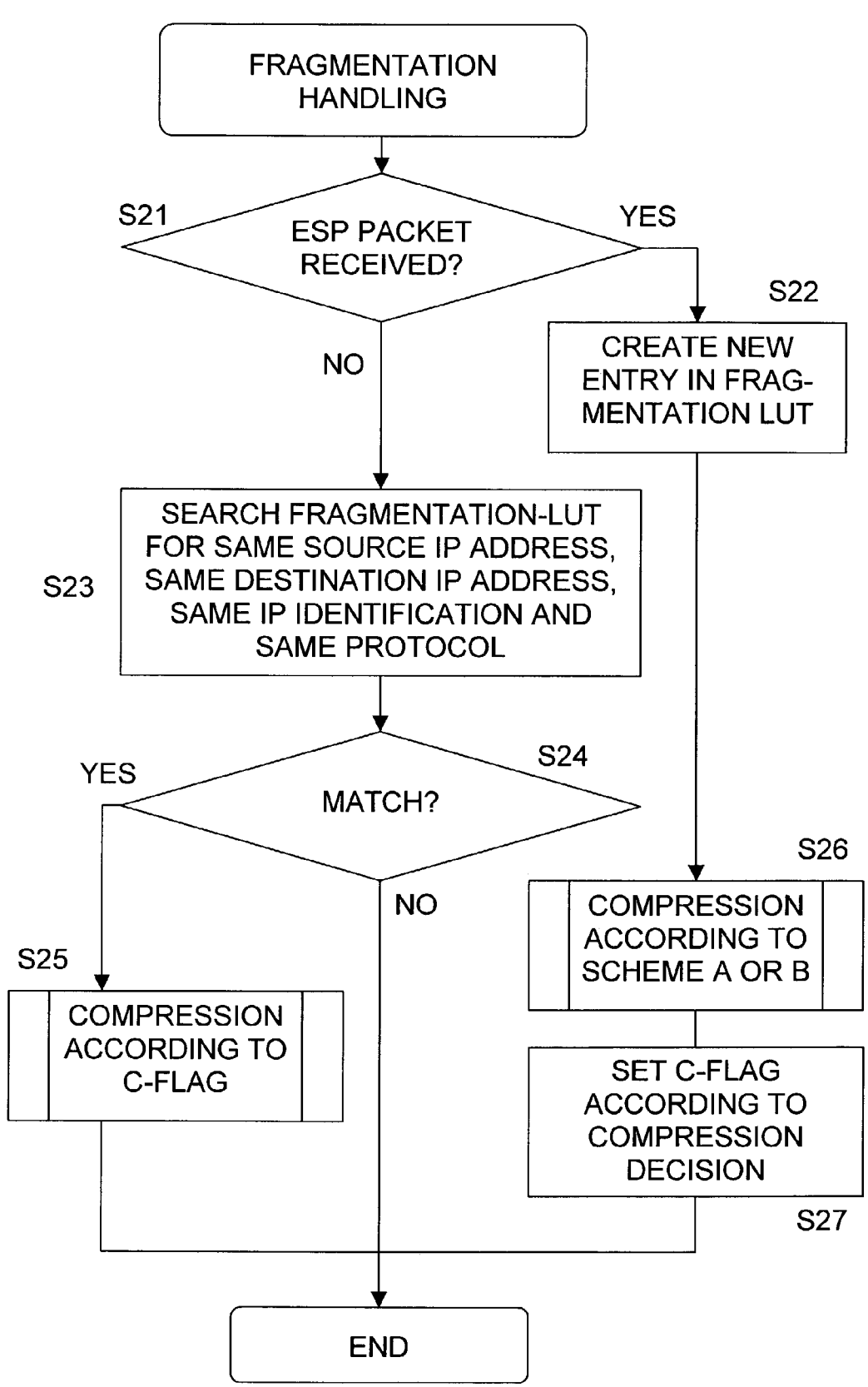
FIG. 4 shows a flow chart illustrating a procedure of handling fragmented data packets according to a third embodiment of the invention.

That is, in the procedure according to the third embodiment as shown in FIG. 4, the compressor checks in step S21 whether an ESP packet or a non-ESP packet has been received. In case an ESP has been received, the new entry in the fragmentation lookup table (fragmentation LUT) is created in step S22. Thereafter, the compression of the packet is carried out in step S26 as described in the first or second embodiment. In case the first embodiment is applied, this means that the packet is simply compressed, since it is already determined that this packet is encrypted (due to the ESP header found).

In case of the second embodiment, steps S5 and subsequent may follow. Depending on whether the compression of the data packet was actually carried out, the C-Flag is set in step S27. That is, in case the packet was compressed in step S26, the C-flag is set true, otherwise the C-flag is set false.

If a non-ESP packet is received (no in step S21), it is possible that this packet is a fragmented packet. Hence, the fragmentation lookup table is searched for the same source IP address, the same destination IP address, the same IP identification and the same protocol in step S23. If a match is found in step S24, then the compression is carried out according to the C-flag (S25) which is part of the found entry (part of the above-described tuple). On the other hand, if no match is found, the compression is carried out as described above in the first or second embodiment.

In the third embodiment it is described that the a fragmented data packet is identified by the tuple <source IP address, destination IP address, IP Identification, protocol, C-flag> in case of Ipv4, or <source IP address, destination IP address and IP Identification, C-flag> in case of Ipv6.

In the following, a fourth and a fifth embodiments of the invention is described.

The fourth and fifth embodiments are related to compression of payload carried in UDP (User Datagram Protocol) and TCP (Transmission Control Protocol) packets. In particular, according to the fourth and fifth embodiment procedures are employed which detect and avoid compression of UDP/TCP payload that has been encrypted by TLS/SSL (Transport Layer Security/Secure Sockets Layer).

Two procedures will be described below which solve the problem in two different cases. The first one is described in the fourth embodiment and applies to various applications, while the second one is described in the fifth embodiment and is specific to HTTP/1.1 (Hypertext Transfer Protocol/ 1.1). Note that they are independent to each other and can be implemented either together or individually.

The procedure according to the fourth embodiment (in the following also referred to as "procedure 1") filters TLS packets based on port numbers.

In TCP/IP and UDP networks, a port is an endpoint to a logical connection. The port number identifies what type of port it is. The historical practice of deploying TLS/SSL is to assign parallel (with respect to "normal") secure port numbers for applications running over TLS/SSL. This allows an endpoint to easily disambiguate between packet flows over TLS/SSL and those that do not. For example, the well-known "normal" port number for HTTP protocol is 80 while HTTP protocol over TLS uses port number 443.

Figure 5:
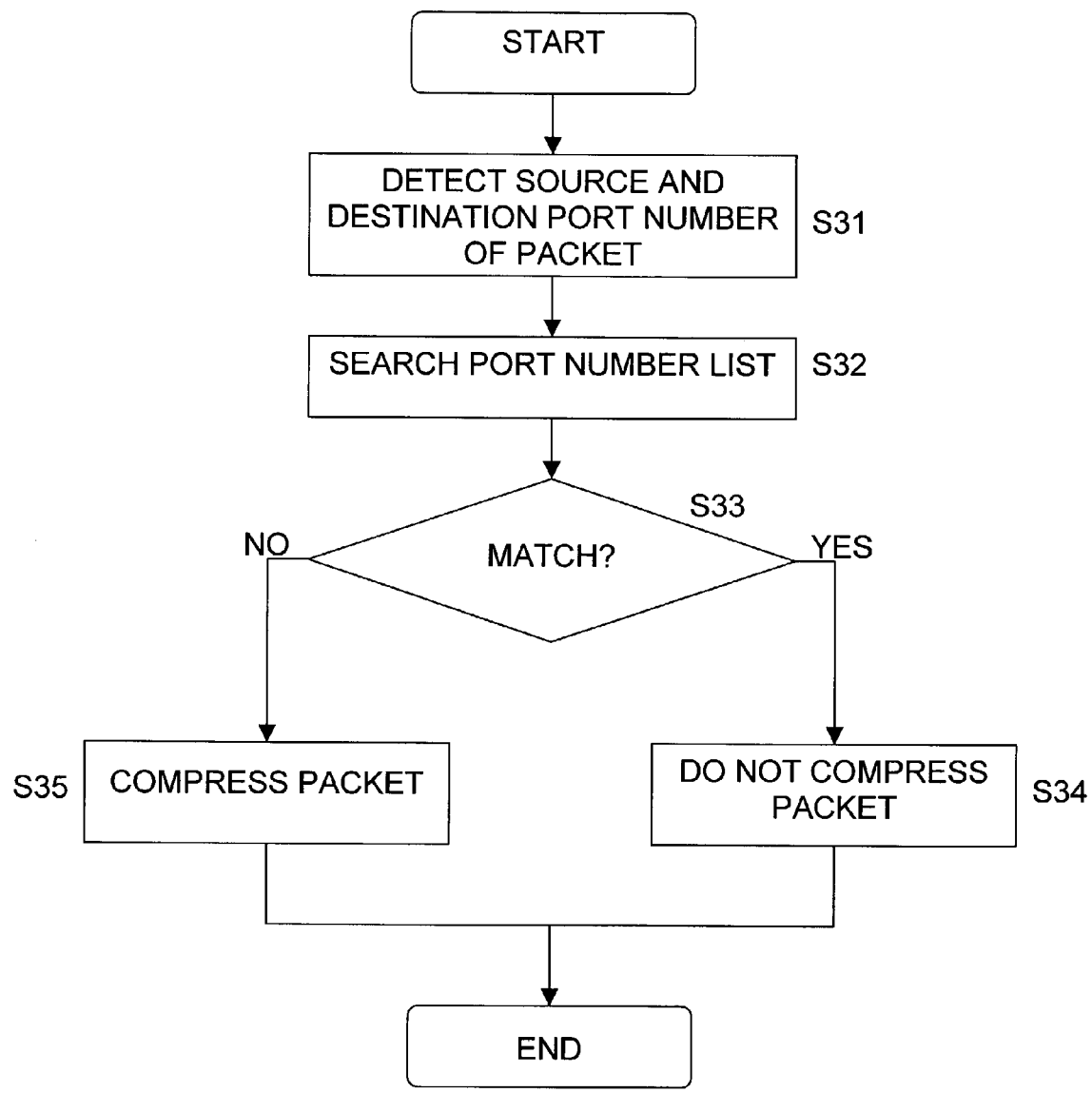
FIG. 5 shows a flow chart illustrating a procedure of identifying encrypted data packets by considering port numbers according to a fourth embodiment of the invention.

The above practice makes it possible for a compressor to filter out TLS/SSL packets based on port number. This procedure is described in the following by referring to FIG. 5.

A compressor maintains a list of well-known or registered secure port numbers (see below about where to obtain them). When a UDP/TCP packet arrives, the compressor detects the source and destination port number of the packet (step S31). Thereafter, the compressor searches the port number list for the same source and destination port number of the packet (step S32). That is, if either the source or the destination port number equals one of the special value, this is considered as a match. I.e., it is sufficient if only one of them matches. If a match is found (yes in step S33), the packet carries TLS/SSL encrypted data and should not be compressed (step S34). Otherwise (no in step S33), the compressor can compress the packet (S35). Preferably, however, the compressor can base its decision whether to compress the packet or not on other factors (e.g. current CPU load and/or acceptable processing delay).

The well-known and registered secure port numbers can be found at http://www.iana.org/assignments/port-numbers, for example. Below is the list as of Jul. 19, 2002. Note that the IETF (Internet Engineering Task Force) has deprecated the above practice of issuing parallel secure port numbers to avoid running out of port number space. However, this does not affect the applicability of the procedure according to the fourth embodiment to those port numbers already assigned to TLS/SSL.

| Keyword | Decimal | Description |
| --- | --- | --- |
| nsiiops | 261/tcp | IIOP Name Service over TLS/SSL |
| nsiiops | 261/udp | IIOP Name Service over TLS/SSL |
| https | 443/tcp | http protocol over TLS/SSL |
| https | 443/udp | http protocol over TLS/SSL |
| nntps | 563/tcp | nntp protocol over TLS/SSL (was snntp) |
| nntps | 563/udp | nntp protocol over TLS/SSL (was snntp) |
| ldaps | 636/tcp | ldap protocol over TLS/SSL (was sldap) |
| ldaps | 636/udp | ldap protocol over TLS/SSL (was sldap) |
| ftps-data | 989/tcp | ftp protocol, data, over TLS/SSL |
| ftps-data | 989/udp | ftp protocol, data, over TLS/SSL |
| ftps | 990/tcp | ftp prot., contr., over TLS/SSL |
| ftps | 990/udp | ftp prot., contr., over TLS/SSL |
| telnets | 992/tcp | telnet protocol over TLS/SSL |
| telnets | 992/udp | telnet protocol over TLS/SSL |
| imaps | 993/tcp | imap4 protocol over TLS/SSL |
| imaps | 993/udp | imap4 protocol over TLS/SSL |
| ircs | 994/tcp | irc protocol over TLS/SSL |
| ircs | 994/udp | irc protocol over TLS/SSL |
| pop3s | 995/tcp | pop3 protocol over TLS/SSL (was spop3) |
| pop3s | 995/udp | pop3 protocol over TLS/SSL (was spop3) |
| dicom-tls | 2762/tcp | DICOM TLS |
| dicom-tls | 2762/udp | DICOM TLS |
| cops-tls | 183/tcp | COPS/TLS |

-continued

| Keyword | Decimal | Description |
| --- | --- | --- |
| cops-tls | 3183/udp | COPS/TLS |
| xtrms | 3424/tcp | xTrade over TLS/SSL |
| xtrms | 3424/udp | xTrade over TLS/SSL |
| sip-tls | 5061/tcp | SIP-TLS |
| sip-tls | 5061/udp | SIP-TLS |

With the procedure according to the fourth embodiment, the CPU and memory cost is extremely small and far outweighed by gain in resource savings due to the avoidance of wasteful compression.

Next, the case is discussed in which HTTP/1.1 over TLS is detected on a normal port number by way of a fifth embodiment of the invention.

As mentioned above, the historical practice to run HTTP (as described in Fielding, etc., "Hypertext Transfer Protocol 1.1—HTTP/1.1", IETF RFC 2616, June 1999, for example) over TLS/SSL is to use UDP or TCP port number 443 (as described in Rescorla, E., "HTTP Over TLS", IETF RFC 2818, May 2000). However, Khare, R. and S. Lawrence, "Upgrading to TLS Within HTTP/1.1", IETF RFC 2817, May 2000 introduces an upgrade mechanism in HTTP/1.1 to initiate TLS over an existing TCP connection. In particular, this means an HTTP server or client can send unsecured data over the well known port number 80 and later "switch on" TLS to carry secured HTTP data.

In this case, the procedure according to the fourth embodiment is not applicable since here the same port number is used for unsecured data (i.e., non-encrypted data packets) and for secured data (i.e., encrypted packets). However, a compressor can detect the upgrade event by scanning HTTP header fields and thus avoid compressing TLS data. The key is that before a TLS handshake starts, the HTTP server must send the intermediate "101 Switching Protocol" and must include an Upgrade response header containing "TLS/1.0" as the target protocol ("Upgrading to TLS Within HTTP/1.1", IETF RFC 2817, section 3.3):

HTTP/1.1 101 Switching Protocols
Upgrade: TLS/1.0, HTTP/1.1
Connection: Upgrade

Below is the detailed procedure for a compressor to detect TLS over TCP port number 80:

The compressor maintains a lookup table for HTTP connections over TLS. Each entry in the table will store a tuple <server IP address, client IP address, client port number>. Note that, since 80 is known as the port number at the HTTP server, it does not need to be included. Initially, the table is empty.

For each received TCP packet, the compressor will take the following procedure:

```
If source port number = 80 {       /* the packet is
sent from the HTTP server */
    Extract <source IP address, destination IP
    address, destination port number> from packet
    Search the lookup table for a match
    If mach found, the packet carries TLS encrypted
    data, do not compress
    Else {
        Scan the packet, from the beginning, for
        101 response as shown above (see below for
        notes)
        If found, add <source IP address,
        destination IP address, destination port
```

```
              number> to the lookup table
              Else, do nothing
       }
   }
   Else if destination port number = 80 {
              /* the packet is sent from an HTTP client */
              Extract <destination IP address, source IP
              address, source port number> from packet
              Search the lookup table for a match
              If mach found, the packet carries TLS encrypted
              data, do not compress
              Else, do nothing
   }
   Else {/* the TCP packet does not carry HTTP data */
       Do nothing
              /* That is, the compression of the packet
              is decided based on other factors, e.g., as in
              method 1 */
   }
```

Figure 6A:
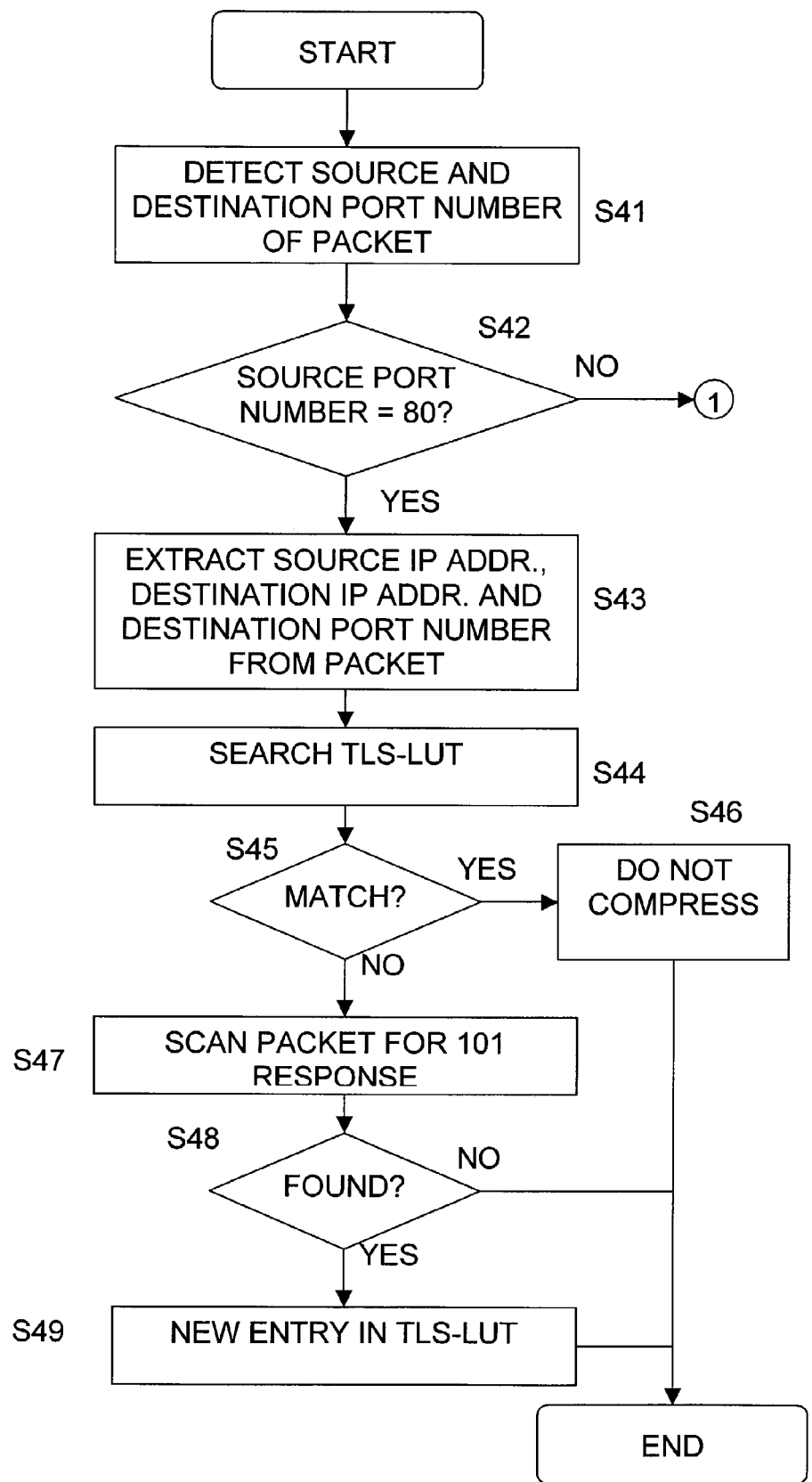
FIGS. 6A and 6B show a flow chart illustrating a procedure according to a fifth embodiment, in which encrypted data packets are handled which cannot easily be identified by referring to the port numbers.
Figure 6B:
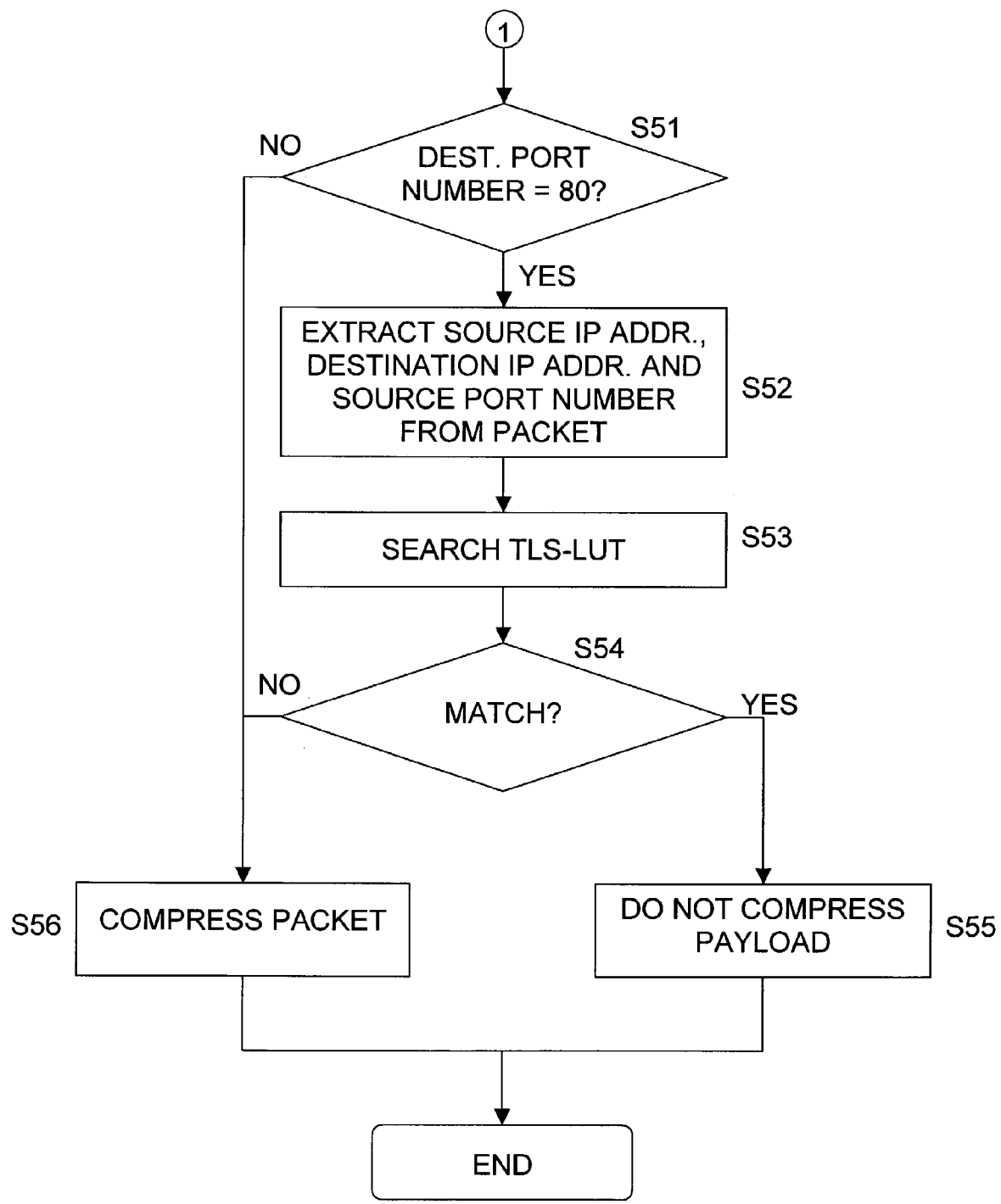

The above procedure is also illustrated in the flowchart shown in FIGS. 6A and 6B. In step S41, the source and destination port numbers are detected. In step S42, it is checked whether the source port number is 80. If this is true, the source IP address, the destination IP address and the destination port number are extracted from the packet in step S43. Thereafter, the lookup table for HTTP connection over TLS (abbreviated as TLS-LUT in the figures) is searched for a match.

If a match is found (yes in step S45), the packet carries TLS encrypted data and is not compressed (step S46) and the routine ends. If no match is found, the packet is scanned for the 101 response in step S47. In case it is found (yes in step S48), a new entry is created in the above lookup-table in step S49. Otherwise, the routine ends.

If in step S42 the source port number is not 80, the procedure advances to step S51 in FIG. 6B (indicated by the circled 1). In step S51 it is checked whether the destination port number is 80. If this is false, then the TCP packet does not carry HTTP data, i.e., is not encrypted via TLS. Hence, it can be compressed in step S56, or, similar to the procedure according to the fourth embodiment, the decision whether to compress or not can be based on other factors (e.g. current CPU load and/or acceptable processing delay).

If, however, the destination port number is 80 (yes in step S51), the source IP address, the destination IP address and the source port number are extracted from the packet in step S52. Then, similar to step S44, the lookup table is searched for a match in step S53. If a match is found (yes in step S54), the packet carries TLS encrypted data and is not compressed (step S55). On the other hand, if no match is found, the packet does not carry TLS encrypted data. Hence, it can be compressed (step S56) or the decision whether to compress it or not can be based on other factors.

Notes for searching "101 Switching Protocol" response in a TCP packet: a) the response must consist of 4 lines: 3 non-empty lines (see above) and the last line is empty; b) each line must be terminated with CRLF; c) search must be case-insensitive; d) "Switching Protocols" in the first line is not essential, i.e., it must still be considered a match if the first line contains different words or even no words after "101". It is noted that the above CRLF stands for CR—Carriage return (an SCII control character) and LF—Linefeed (an ASCII control character).

Moreover it is noted that the above scheme works for any port number (other than 80) that the compressor knows is carrying HTTP data. For example, a client behind a firewall may be configured to use a different TCP port number X, instead of 80, to talk to a proxy server in order to access external web sites. In that case, one can simply create another lookup table for the port number X and replace 80 with X in the logic described above.

The above scheme works also for transport other than TCP. Combined with above note, one can simply create a lookup table for each combination of (transport protocol, known HTTP port number for that protocol).

In implementation, the table lookup time can be reduced by techniques such as binary search and hashing. Creating multiple lookup tables as described above is already a good (divide-and-conquer) way of speed up the lookup procedure.

Although possible in theory, it is unlikely that a "101 Switching Protocols" response from a HTTP server will not appear in the beginning of the TCP packet carrying them. For simplicity and efficiency, the abnormal cases can be ignored, since these cases occur so rarely that a further procedure designed for these would not be efficient.

An entry of the lookup table can be deleted based on timeout since last time of access, or by detecting close of the connection (e.g. sniffing FIN in TCP header). (It is noted that FIN is a control flag in TCP header which indicates that there is no more data from the TCP sender. It is used in the procedure to terminate a TCP connection.)

It is noted that for the procedure according to the fifth embodiment, one table lookup for each HTTP packet and one scan into packet is necessary if the lookup does not return a match. The lookup tables also consume memory. However, this procedure is advantageous and effective in case a high percentage of HTTP traffic is present that initiates the TLS upgrade mechanism.

Moreover, the port number is only an example for a connection type. That is, in other network types, the connection type may be indicated in an other way.

The above description and accompanying drawings only illustrate the present invention by way of example. Thus, the embodiment may vary within the scope of the attached claims.

For example, the invention can be applied to the handling of IP packets encrypted by any encryption protocols at IP layer, including but not limited to ESP.

Moreover, the above embodiments can be combined arbitrarily.

In detail, as described above, the implementations of the first to third embodiments basically are related to encryption at IP layer (i.e., ESP). The fourth and fifth embodiments are related to encryption at TCP or UDP layer, which is above the IP layer. Thus, preferably a compressor first checks whether a received packet is ESP. Only if not, it may further check if TLS is used. The other way round (i.e., checking if TLS is used and then checking whether an ESP packet is present) is not advantageous, since a packet encrypted by ESP at IP layer means that the TCP or UDP header is also encrypted.

The invention can be implemented as an enhancement to any compressor. Note that it is strictly a local optimisation and does not require any standardization. The invention can be used in any network element (e.g. in GPRS (General Packet Radio Service) network elements like GGSN (Gateway GPRS Support Node) or SGSN (Serving GPRS Support Node) or router) that perform IP payload compression.

The invention claimed is:

1. A method for conveying data packets in a network, comprising
    examining whether a received data packet is encrypted,
    compressing the data packet in case it is examined that the data packet is not encrypted, and
    refraining from compressing if it is examined that the data packet is encrypted,
    wherein if the data packet is encrypted, before compressing, the method further comprises:

examining whether the data packet belongs to a group of data packets which are encrypted with a NULL algorithm, and if the data packet belongs to the group, compressing the packet according to a compression indication associated to the group, wherein information regarding the group of data packets are listed in a lookup table, wherein the information comprises at least a destination address of the data packet and the compression indication.

2. The method according to claim 1, wherein the examining step comprises detecting whether the use of a particular encryption algorithm is indicated in the header of the data packet.

3. The method according to claim 2, wherein the particular encryption algorithm is encapsulating security payload (ESP).

4. The method according to claim 1, wherein if the data packet does not belong to a group of data packets encrypted with the NULL encryption algorithm, a new entry in the lookup table is created, wherein the group of data packets is identified by a destination address of the packet, and wherein a compression is performed, and the result of compression is evaluated, wherein the compression indication is set according to the result of the compression.

5. The method according to claim 4, wherein the result of compression is evaluated based on a percentage of compression.

6. The method according to claim 1, wherein a table for fragmented data packets is provided, a data packet being identified therein by at least a source address, a destination address and a compression indication indicating whether this data packet should be compressed, wherein during examining, the method further comprises:

judging whether the source address and the destination address of the data packet matches with an entry of the table for fragmented data packets, and compressing or not compressing the data packet based on the compression indication.

7. The method according to claim 6, wherein if the data packet is encrypted, the method further comprises creating a new entry in the table for fragmented data packets, wherein the compression indication is set depending on whether the encrypted data packet should be compressed.

8. The method according to claim 1, wherein during examining it is determined whether the data packet belongs to a group of encrypted data packets, and when the data packet belongs to a group of encrypted data packets, the data packet is not compressed.

9. The method according to claim 8, wherein it is determined whether the data packet belongs to the group of encrypted data packets based on at least one of the source or destination connection type of the data packet.

10. The method according to claim 1, wherein a table is provided in which connections in a network using encryption are stored, wherein for each entry, a source address, a destination address and a destination connection type is stored.

11. The method according to claim 10, wherein the examining further comprises:

deciding whether a data packet is received via a specific source connection type or is to be sent via a specific destination connection type, if the data packet is received via the specific source connection type, or is to be sent to the specific destination connection type, extracting the source address, the destination address and the destination connection type from the data packet, and searching for a match with the table, wherein in case a match is found, the data packet is not compressed.

12. The method according to claim 11, wherein in case the data packet is received via a specific connection type and no match is found, the data packet is searched for an indication of a specific encryption procedure, and in case the indication is found, a new entry is created in the table with the source address, destination address and destination connection type of the data packet.

13. The method according to claim 9 or 10, wherein the connection type is defined by a port number.

14. The method according to claim 12, wherein the specific encryption procedure is a transport layer security (TLS) protocol.

15. The network element according to claim 14, wherein the network element is a router.

16. A network element to convey data packets in a network, the network element is configured to:

determine whether a received data packet is encrypted;

compress the data packet in case it is determined that the data packet is not encrypted; and refrain from compressing in case it is determined that the data packet is encrypted, wherein if the data packet is encrypted, the network element is further configured to perform the following, before the compressing the data packets:

examine whether the data packet belongs to a group of data packets which are encrypted with a NULL algorithm, and in case the data packet belongs to the group, to compress the packet according to a compression indication associated to the group, wherein the network element comprises a memory unit in which a table comprising information regarding the group of data packets is stored, wherein the information comprises at least a destination address of the data packet and the compression indication.

17. The network element according to claim 16, further configured to detect whether the use of a particular encryption algorithm is indicated in the header of the data packet.

18. The network element according to claim 17, wherein the particular encryption algorithm is encapsulating security payload (ESP).

19. The network element according to claim 16, wherein if the data packet does not belong to a group of data packets encrypted with the NULL encryption algorithm, the network element is configured to create a new entry in the lookup table, and identify the group of data packets by a destination address of the packet, wherein the network element is further configured to perform a compression and to evaluate the result of compression is evaluated, and to set the compression indication according to the result of the compression.

20. The network element according to claim 19, wherein the network control element is further configured to evaluate the result of compression by checking a percentage of compression.

21. The network element according to claim 16, wherein the network control element comprises a memory unit in which a table for fragmented data packets is stored, a data packet being identified therein by at least a source address, a destination address and a compression indication indicating whether this data packet should be compressed, wherein during the examination, the network element is further configured to judge whether the source address and the destination address of the data packet matches with an entry of the table for fragmented data packets, and decide to compress the data packet based on the compression indication.

22. The network element according to claim 21, wherein if the data packet is encrypted the network element is configured to create a new entry in the table for fragmented data packets, wherein network element is configured to set the compression indication based on whether the encrypted data packet should be compressed or not.

23. The network element according to claim 16, wherein the network element is configured to determine during the examination whether the data packet belongs to a group of encrypted data packets, and if the data packet belongs to a group of encrypted data packets, refrain from compressing the data packet.

24. The network element according to claim 23, wherein the network element is adapted to determine whether the data packet belongs to the group of encrypted data packets by checking the source and/or destination connection type of the data packet.

25. The network element according to claim 16, wherein the network element comprises a memory unit in which a table is stored in which connections in a network using encryption are stored, wherein for each entry a source address, a destination address and a destination connection type indication is included.

26. The network element according to claim 25, wherein the network element is configured to, during the examination, decide whether a data packet is received via a specific port number or is to be sent via a specific connection type, and if the data packet is received via the specific connection type or is to be sent to the specific connection type, extract the source address, the destination address and the destination connection type from the data packet, search for a match with the table, and, in case a match is found, refrain from compressing the data packet.

27. The network element according to claim 26, wherein if the data packet is received via a specific connection type and no match is found the network element is configured to search the data packet for an indication of a specific encryption procedure, and, if the indication is found, create a new entry in the table with the source address, destination address and connection type of the data packet.

28. The network element according to claim 24 or 25, wherein the connection type is defined by a port number.

29. The network element according to claim 27, wherein the specific encryption procedure is a transport layer security (TLS) protocol.

30. A device, comprising means for convey data packets in a network, means for determining whether a received data packet is encrypted;

means for compressing the data packet in case it is determined that the data packet is not encrypted; and means for refraining from compressing in case it is determined that the data packet is encrypted, wherein if the data packet is encrypted, the device further comprises means for examining, before compressing the data packets, whether the data packet belongs to a group of data packets which are encrypted with a NULL algorithm, and means for compressing the packet according to a compression indication associated to the group, in case the data packet belongs to the group, wherein the device comprises a memory means for storing a table comprising information regarding the group of data packets, wherein the information comprises at least a destination address of the data packet and the compression indication.

* * * * *